(12) United States Patent
Bresser

(10) Patent No.: US 10,332,287 B2
(45) Date of Patent: Jun. 25, 2019

(54) MEASURING DEVICE AND METHOD FOR VISUALLY PRESENTING A SIGNAL PARAMETER IN A DISPLAYED SIGNAL

(71) Applicant: Rohde & Schwarz GmbH & Co. KG, Munich (DE)

(72) Inventor: Gerd Bresser, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 14/930,364

(22) Filed: Nov. 2, 2015

(65) Prior Publication Data

US 2017/0124736 A1    May 4, 2017

(51) Int. Cl.
    G09G 3/00      (2006.01)
    G09G 5/00      (2006.01)
    G09G 5/02      (2006.01)
    G06T 11/20     (2006.01)

(52) U.S. Cl.
    CPC .............. G06T 11/206 (2013.01); G09G 5/00 (2013.01); G09G 3/003 (2013.01); G09G 5/02 (2013.01); G09G 2340/14 (2013.01)

(58) Field of Classification Search
    CPC ....... A61B 8/461; G01R 13/30; A61L 38/461; G06F 11/00; G09G 3/3696; G09G 5/18; G09G 2330/02; H04N 17/00; G11B 19/044
    See application file for complete search history.

(56) References Cited

U.S. PATENT DOCUMENTS

| | | | | |
|---|---|---|---|---|
| 5,675,136 A * | 10/1997 | Keinath | ............. | G06K 7/10851 235/454 |
| 5,959,607 A | 9/1999 | Montijo | | |
| 2001/0033260 A1 * | 10/2001 | Nishitani | ............. | G09G 3/3406 345/87 |
| 2007/0244656 A1 * | 10/2007 | Cranford, Jr. | ..... | G01R 31/31709 702/79 |
| 2007/0279038 A1 * | 12/2007 | Takada | .................. | G01R 29/027 324/76.25 |
| 2009/0195536 A1 * | 8/2009 | Louise | ............... | G01R 13/0236 345/419 |
| 2010/0030517 A1 | 2/2010 | Schmidt | | |
| 2012/0326738 A1 * | 12/2012 | Kim | ............... | G01R 31/318371 324/750.01 |

FOREIGN PATENT DOCUMENTS

EP        1340987 A2      9/2003
WO    WO2008064752 A1    6/2008

* cited by examiner

*Primary Examiner* — Haixia Du
(74) *Attorney, Agent, or Firm* — Potomac Technology Law, LLC

(57) ABSTRACT

The invention is related to a measuring device and a method for visually presenting a signal parameter in a displayed signal that comprises the following steps: measuring the signal with a measuring device; buffering the measured signal in a buffer of the measuring device; displaying the buffered signal on a display of the measuring device; determining a signal parameter of the buffered signal in at least two separate signal regions of the buffered signal; and directly displaying the determined signal parameter in the displayed signal at the corresponding signal region.

14 Claims, 8 Drawing Sheets

MEASURING DEVICE AND METHOD FOR VISUALLY PRESENTING A SIGNAL PARAMETER IN A DISPLAYED SIGNAL

FIELD

The invention is related to a measuring device and a method for visually presenting a signal parameter in a displayed signal.

Such a measuring device, e.g., an oscilloscope or a network analyzer, presents a signal to be measured on a display unit of the measuring device, for example by drawing a graphical representation in a diagram. The measuring device might offer the presentation of a signal-level distribution of the signal to be measured in the frequency domain or in the time domain. For this presentation it is determined whether in each case a signal level of the signal to be measured is present within the respective signal-level range and at the respective value of the time or frequency raster. The term waveform might alternatively be used instead of the term signal to be measured.

BACKGROUND

An oscilloscope as a type of signal measuring device and is used to qualitatively and quantitatively analyze a signal to be measured, typically but not exclusively in the time-domain. The oscilloscope displays an analog graphical representation of one or more of its input channels.

In the publication WO 2008/064752 A1 a method and a system for determining a statistic measurement parameter is disclosed. The continuous updating of the display unit of a measuring device with a current frequency-distribution of a signal level of an applied waveform against time or frequency allows only the presentation of the current frequency distribution of a stochastic signal. Therefore, within an observation interval, the frequency of the signal levels of the applied waveform is counted from new, buffered and presented for display on a display device. A respective statistical parameter is determined from the currently-counted frequency and from the frequency measured and buffered respectively in earlier observation intervals and re-buffered.

Nowadays, measuring devices are able to display waveforms or graphical representations of input channels. In persistence mode of the measuring device the frequency distribution is accumulated over a plurality of waveforms and thus a sum of the frequency distribution is obtained.

Additionally, it is known to present the frequency distribution information of a waveform not only by increasing or decreasing of the contrast values of the displayed signal. It is also possible to use a color spectrum to present such waveform frequency distribution information.

It is also known to use a so-called "track-function" of a measuring device. A track is a waveform that shows measurement values in time-correlation to the signal to be measured. Thus, the track-function is the graphical interpretation of all measurement values of a single acquisition. Thus, using the track-function, a signal parameter can be derived from the signal over a plurality of waveforms. This is specifically applicable for periodic signals in which a specific signal parameter is obtained in each period of the signal to be measured. Thus, signal parameters can be derived over frequency or time and can be analyzed due to changes of their signal parameter characteristics.

Nowadays, signal parameters that are derived with such a track-function of a signal measuring device are displayed on a separate diagram on a display unit of the measuring device apart from the diagram on which the signal itself is displayed. In case the signal to be analyzed needs to be detected over large time durations, the variations of the track-function is heavily reduced and compressed in a manner that details cannot be derived from this track-function plot. It is nearly impossible to efficiently analyze the signal parameter.

To somehow analyze such a signal, the user is forced to use a zoom-function of the measuring device to obtain detailed information from the track-function plot of the signal parameter. Since the user cannot figure out in which part of the waveform it should be zoomed in, he is forced to randomly pick a specific region of the signal for zooming in. In case the signal parameter does not include any abnormal behavior in the randomly picked region, another region of the signal has to be chosen and zoomed. The analysis is thus a trial-and-error method which is inefficient and time-consuming. Also, It is thus questionable whether the user is actually able to identify any abnormal behavior of the signal parameter.

What is needed, therefore, is a measuring approach whereby a signal parameter of a signal to be measured is presented on a display unit of the measuring device in a more efficient way and without the risk of missing any abnormal behavior or regions of interests in the signal.

SOME EXAMPLE EMBODIMENTS

Example embodiments of the present invention advantageously address the foregoing requirements and needs, as well as others, by providing equipment and associated methods that facilitate the display of a signal parameter of a signal to be measured on a display unit of a measuring device in a more efficient way, without the risk of missing any abnormal behavior or regions of interests in the signal.

In accordance with certain of such example embodiments, a method is provided for visually presenting a signal parameter in a displayed signal. The method comprises measuring the signal with a measuring device, buffering the measured signal in a buffer of the measuring device, and displaying the buffered signal on a display of the measuring device. The method further comprises, determining a signal parameter of the buffered signal in at least two separate signal regions of the buffered signal, and displaying the determined signal parameter in the displayed signal at the corresponding signal regions.

In accordance with others of such example embodiments, a measuring device is provided for visually presenting a signal parameter in a displayed signal. The measuring device comprises an input terminal configured to receive a signal to be measured, a buffering unit configured to buffer the received signal, and a display unit is configured to display the buffered signal. The measuring device further comprises a processing unit configured to determine at least one signal parameter from the buffered signal, wherein the signal parameter of the buffered signal is determined in at least two separate signal regions. Further, the display is configured to display the determined signal parameter in the displayed signal at the corresponding signal region. By way of example, an analog digital converter is used to oversample the signal to be measured in order to obtain an accurate signal parameter determination. By way of further example, the display is a color display and the determined signal parameter is presented in a miscolor or psuedocolor. By way of further example, the display unit is configured to directly display the signal parameter in the displayed signal in a first diagram and to display the signal parameter in a second diagram.

According to one embodiment, the measuring device may be an oscilloscope, such as a digital storage oscilloscope (DSO), or a real-time-oscilloscope (RTO) may be used in situations where it is possible to determine the signal parameters in real time. Alternatively, the measuring device may be a network analyzer, and particularly a vector network analyzer (VNA), or a spectrum analyzer. A signal analysis in the frequency-domain and/or the time-domain would thereby be possible.

According to a further embodiment, the buffering of the measured signal is performed by a buffering unit that is included in the measuring device. By way of example, such a buffering unit comprises a non-volatile memory, such as an erasable programmable read-only memory (EPROM), and electrically erasable programmable read-only memory (EEPROM) or a flash memory. Alternatively, a random access memory (RAM) technology based buffering unit may be employed for buffering the measured signal in order to apply a subsequent analysis using the buffered measured signal.

According to a further embodiment, the determination of the signal parameter of the signal to be measured is performed by a processing unit of the measuring device.

According to further embodiments, a signal region of the signal to be measured is either a digital sample of the signal or a specific signal range, where the signal range may be defined by a plurality of signal samples. Additionally, a signal region may be a period of the waveform and/or an edge of the waveform, such as rising edge or a falling edge, a pulse width or a cycle width. Further, the signal parameter may be derived from two separate regions, so that the parameter is determined at least twice in the signal to be measured. Thus, the track-function of the measuring device is used. The number of regions for determining the signal parameter might also be further increased. The signal region may be a frequency region or a time region of the appropriate scale in a diagram on which the signal is presented.

According to a further embodiment, the determination of the signal parameter is obtained based on user choice. For example, the user selects the signal parameter that should be determined, wherein a user input device may be employed in the measuring device to capture the user selection.

According to a further embodiment, the determined signal parameter is displayed in a manner whereby the signal is presented and displayed on the display unit as a graphical representation of the signal, and the signal parameters are highlighted in the corresponding signal region in that graphical representation of this specific signal. By way of example, the same corresponding signal region is used such that that the samples of the signal or the range of the signal such as period, jitter, delay or edge is analyzed at this specific sample point.

In that manner, the signal to be measured and the determined signal parameter may be presented as one single graphical representation. By way of example, the graphical representation may use different preferences, such as contrast, color, textures, etc., to distinguish the signal to be measured from the determined signal parameter. A visual impression can thereby be generated for the user if a signal parameter differs over the signals representation, and whether the differences in the signal parameter values are periodical. Additionally, it can thus be promptly identified whether an abnormal behavior in the signal parameters is contained over the whole signal representation, which then might be analyzed in greater detail. Accordingly, such embodiments of the present invention thereby provide a user-friendly pre-selection of a region of interest in a signal to be measured. Further, a user-friendly way of identifying abnormal signal parameters in a signal to be measured can be presented easily and can be identified without using a zoom-function in a trial and error manner.

According to one such embodiment, the signal parameter is displayed in miscolors, where the term "miscolor" is similar to the term "pseudocolor." By way of example, a visually presented signal parameter is displayed in a clear and evident manner in the signal to be measured as one graphical representation so that a user or operator of the measuring device clearly identifies an abnormal behavior of a signal parameter. Further, the user is thus directly pointed to a region of interest and a zoom function could be applied in a targeted manner. This is an additional mode in the track-function in which a color coding is applied to the signal in accordance with the determined signal parameter.

According to a further embodiment, a color is predefined for a specific signal parameter. This predefinition may be chosen automatically or on the basis of user input. Thus, it is possible to define a color in which a signal parameter should be represented in the signal to be measured. This leads to higher user-friendly operations at the measuring device.

According to a further embodiment, a color is predefined based on a threshold value, such as an adjustable threshold value, of the signal parameter. Thus, the signal parameter that has been determined is classified into different colors or color ranges, wherein an upper signal parameter value and a lower signal parameter value might be defined for a specific color, a color-range and/or an intensity of a color tone. Additionally, a first threshold range of the signal parameter might be predefined and a first color or color range might be assigned thereto. Further, a second threshold value range of the same signal parameter might be predefined and a second color or color range might be assigned thereto. Thus, a user or operator of the measuring device can identify a signal parameter range according to the color that is used.

According to a further embodiment, the color can be coded in accordance with a percentage value of the signal parameter or with a logarithmic value of the signal parameter. By way of example, the percentage value can be derived from a maximum signal parameter and a minimum signal parameter. In the case of a logarithmic value, the value can be derived from a maximum signal parameter and a minimum signal parameter.

A user or operator can easily identify whether a signal parameter is above a threshold value or is below a threshold value according to the color in which the signal is presented.

In accordance with further embodiments, at least two different signal parameters are displayed in the display signal. In this context, the processing unit of the measuring device determines at least two signal parameters. The determination may be performed sequentially or in parallel. Further, each of the signal parameters may be displayed in a predefined color or color range so that a user can easily identify the different signal parameters of the signal in the graphical representation.

According to a further embodiment, the determined signal parameter and the displayed signal are displayed in a three dimensional diagram. The third dimension of this three dimensional diagram may be used to present the signal parameter which has been determined with the processing unit of the measuring device. This allows an increase of user convenience in order to identify an abnormal behavior of a signal parameter.

According to a further embodiment, the displayed signal further comprises a contrast-dependent frequency-scale.

Accordingly, the representation of a signal parameter in one single graphical representation of the signal can be combined with the frequency-distribution of the signal to be measured. Thus, now one signal representation is displayed in which firstly the information is obtained on how often a sample has been triggered and what kind of signal parameter belongs to this frequency-distribution. Thus, a user can identify whether a signal parameter can be ignored or should be analyzed in greater details, since this signal parameter has been triggered more often.

According to a further embodiment, the signal is displayed in a time-domain and the signal parameter is a time-related signal parameter. By way of example, a time-related signal parameter may be a timing measurement, such as a rise time, a fall time, a period or frequency, a positive pulse width, a negative pulse width, a positive duty cycle, a negative duty cycle, a positive switching as a setting time at rising edges and/or a negative switching as a settling time at falling edges. Additionally or alternatively, jitter measurements may be determined as time-related measurements, such as a cycle-to-cycle jitter or a time interval error (TIE). Further, additional time-related values may be employed.

According to a further embodiment, the signal is displayed in a frequency-domain, where the signal parameter is a frequency-related signal parameter. By way of example, a sweep rate can be provided to the user in the graphical representation of the signal.

According to a further embodiment, the determined signal parameter in the displayed signal is presented in a first diagram on the display, and the determined signal parameter is further presented on a second diagram on the display unit of the measuring device for further user convenience.

According to a further embodiment, the signal parameter is displayed as a specific color that varies its intensity of the color tone based on the signal parameter value. By way of example, one color tone differs in its intensity based on the signal parameter. By way of further example, above a certain threshold value of the signal parameter, the color tone becomes lighter and below a certain threshold value of the signal parameter, the color tone becomes darker.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Example embodiments of the present invention are illustrated by way of example only and not by way of any limitation in the figures of the accompanying drawings, in which like reference numerals refer to similar elements and/or functions, and in which.

DETAILED DESCRIPTION

Equipment and associated methods that facilitate the display of a signal parameter of a signal to be measured on a display unit of a measuring device in a more efficient way, without the risk of missing any abnormal behavior or regions of interests in the signal, are described herein. In the following description, for the purposes of explanation, numerous specific details are set forth in order to provide a thorough understanding of the present invention. The present invention is not intended to be limited based on the described embodiments, and various modifications will be readily apparent. It will be apparent that the invention may be practiced without the specific details of the following description and/or with equivalent arrangements. Additionally, well-known structures and devices may be shown in block diagram form in order to avoid unnecessarily obscuring the invention. Further, the specific applications discussed herein are provided only as representative examples, and the principles described herein may be applied to other embodiments and applications without departing from the general scope of the present invention.

Figure 1:
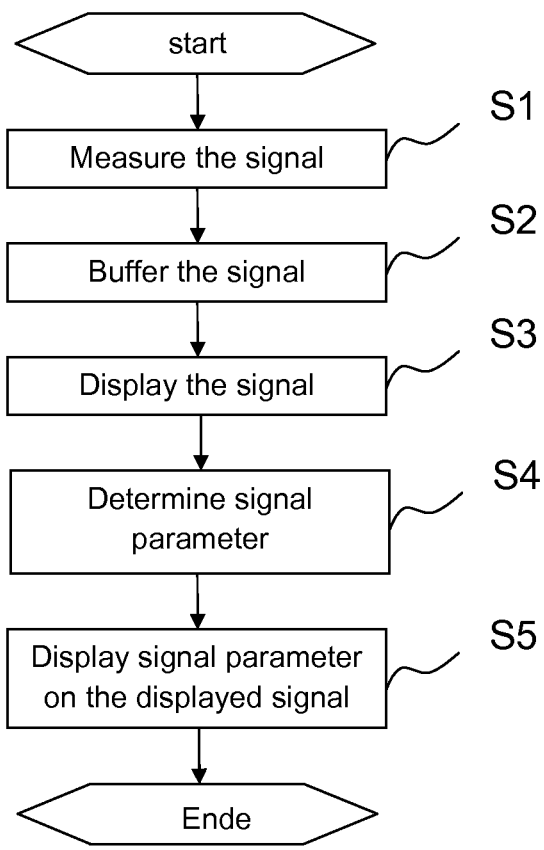
FIG. 1 shows a flow diagram of a method for visually presenting a signal parameter in a displayed signal according to example embodiments.

FIG. 1 shows a flow diagram of a method for visually presenting a signal parameter in a displayed signal according to example embodiments. In step S1 the signal to be measured is measured by a measuring device 1. In a subsequent step S2 the measured signal is buffered in a buffer 8. In step S3 the signal is displayed on a display 5 of the measuring device 1. In step S4 at least one signal parameter 2a is determined using a processing unit 4 of the measuring device. It should be noted that the steps S3 and S4 can be interchanged. Subsequently, the signal parameter 2a is displayed on the displayed signal 2 according to step S5.

By displaying the signal parameters 2a and the displayed signal 2 in one graphical representation of the signal 2 a user-friendly way of representing signal parameters is obtained. Thus, a visual impression can be generated for the user if a signal parameter differs over the signals representation and whether this differences in the signal parameters values are periodical. Additionally, it can be promptly identified whether an abnormal behavior in the signal parameters is obtained over the whole signal representation which might be analyzed in greater details. Further, according to example embodiments, a capability for pre-selection of a region of interest in a signal to be measured may be provided.

Figure 2:
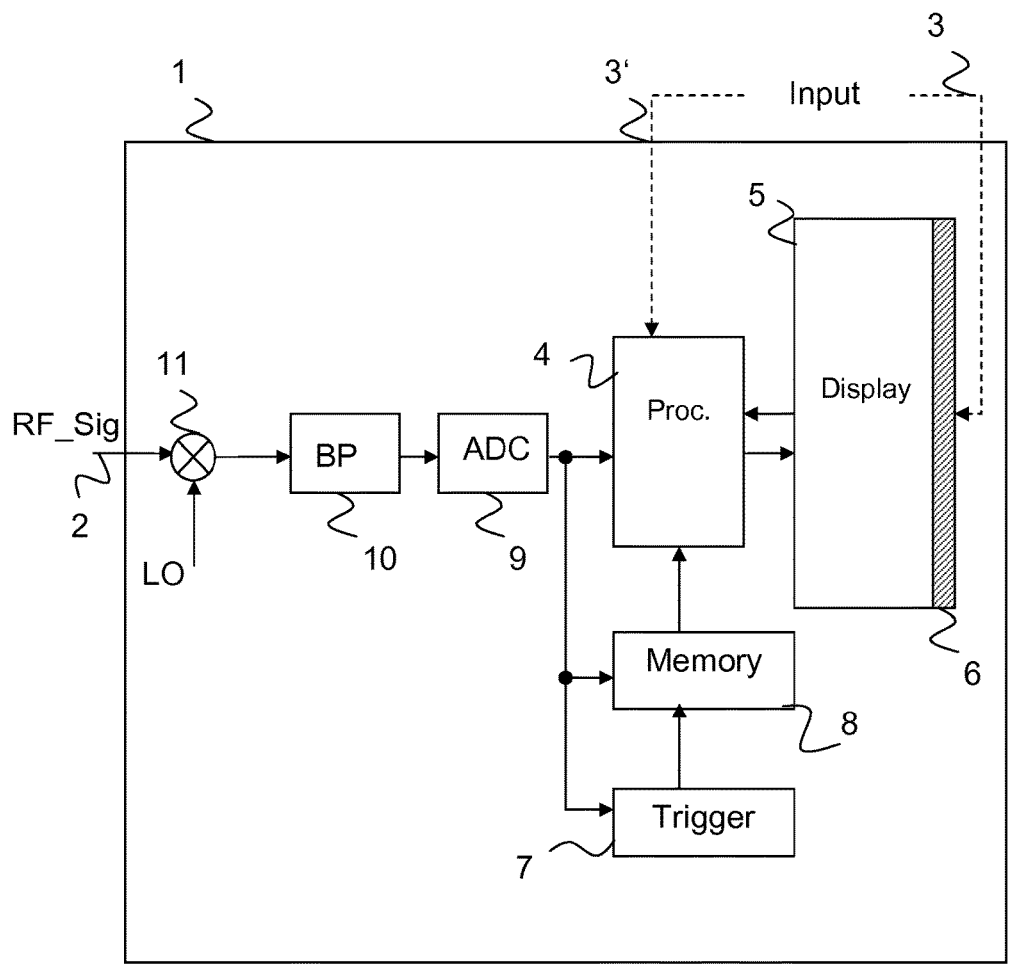
FIG. 2 shows a block diagram of a measuring device according to example embodiments.

FIG. 2 shows a block diagram of a measuring device according to example embodiments. The measuring device 1 comprises an input terminal configured to receive the applied signal 2 to be measured. The signal 2 may be a radio frequency (RF) analog signal, such as a mobile communication signal or a radar system signal. Optionally, a modulation unit 11 is used to demodulate the RF signal 2 using a local oscillator (LO). Further, a band-pass filtering unit 10 may be employed to filter the frequency spectrum of the demodulated RF signal 2 to be measured. In case the signal 2 is an analog signal, an analog-to-digital converter 9 may be employed to digitize the filtered signal 2. A processing unit 4 is used to provide a graphical representation of the signal 2 on a display unit 5. The display unit 5 may comprise a touch screen 6 so that user inputs 3 can be applied directly on the display 5 using finger tips. The measuring device 1 further comprises a buffering unit 8, such as a non-volatile storage unit using flash, erasable PROM (EPROM), or electrically erasable PROM (EEPROM) technology. Alternatively, a volatile memory using random access memory (RAM) technology might be used. The measuring device 1 further comprises a triggering unit 7 which is used to provide a starting point for representing the signal 2 on the display 5. The trigger unit 7 might comprise an external trigger input which is not shown in FIG. 2.

The processing unit 4 is configured to determine signal parameters 2a of the signal 2 and to display the signal parameters 2a with the signal 2 on the display 5 in one graphical representation. The processing unit 4 may consist of an application-specific integrated circuit processing unit or a microprocessor unit.

In FIGS. 3a to 8 different graphical representations of a clock signal (clk), signals 2 and signal parameters 2a are respectively shown. Those graphical representations show the principle of the signal 2 in a very simplified manner that might differ from an actual behavior thereof.

Figure 3A:
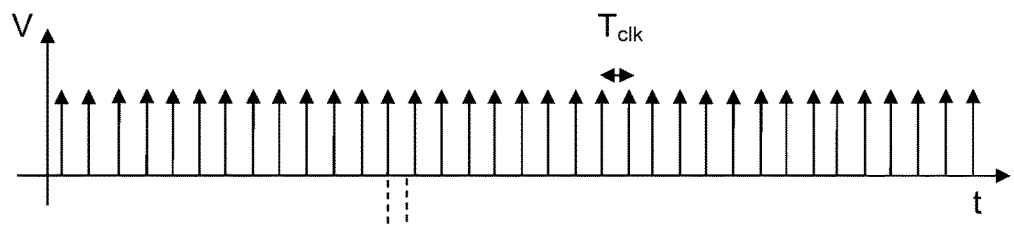
FIG. 3a shows a graphical representation of a clock signal configured to sample the signal to be measured according to example embodiments.

FIG. 3a shows a graphical representation of a clock signal configured to sample the signal to be measured according to example embodiments. The clock signal is illustrated as a plurality of clock samples that are applied to different function blocks in the measurement device, such as the ADC 9, the processing unit 4, the memory 8, the trigger unit 7 and/or the display 6.

According to example embodiments, the clock signal comprises a clock period $T_{clk}$ that is less than at least twice the clock rate $T_{period}$ of the highest signal frequency of the signal 2 applied to the input of the measuring device 1 to fulfill the Nyquist criteria. By way of example, the signals period $T_{period}$ is an integer plurality of the clock period $T_{clk}$. By way of further example, the distance between the specific samples is preferably applied in nanoseconds so that a Gigabit sampling can be applied to in the measurement device 1 in order to provide an accurate signal analyzation with accurate oversampling values.

Figure 3B:
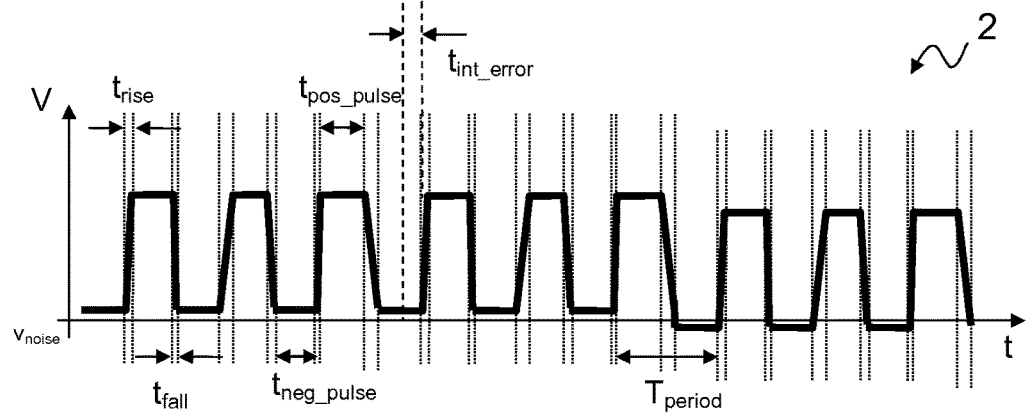
FIG. 3b shows a graphical representation of a signal to be measured and time-related signal parameters according to example embodiments.

FIG. 3b shows a graphical representation of a signal to be measured and time-related signal parameters according to example embodiments. A signal 2 is shown in which the signal parameters are not directly displayed. Further, the definition of different signal parameters 2a is presented on an exemplary waveform 2.

As can be seen, the signal 2 to be measured is a periodic time-domain signal and is plotted with its voltage amplitude V over the time t. The signal 2 to be measured herein comprises nine signal periods with a time period $T_{period}$. By way of example, the time period $T_{period}$ is the duration of time of one duty cycle of the periodic signal 2. The time period $T_{period}$ the reciprocal of the frequency f of the signal 2 be measured. For a non-constant, but periodically repetitive physical appearance, the time period $T_{period}$ is the smallest venue or time interval after which the process is repeated. The term time period $T_{period}$ may be applied to oscillations and waves.

After determination of the time period $T_{period}$, the processing unit 4 may be configured to calculate the frequency f as a signal parameter 2a, which could alternatively or additionally be presented as a signal parameter 2a.

Theoretically, every time period $T_{period}$ should be equal to each of the nine time periods $T_{period}$ in the waveform 2. As can be derived from FIG. 3b different values of the $T_{period}$ are obtained from the signal 2 to be measured. To analyze the variation of the time periods $T_{period}$ of the signal 2, the time periods $T_{period}$ of the signal 2 is to be determined as a signal parameter 2a, wherein a track-function might be used to identify each time period value.

Another signal parameter 2a to be determined might be the positive pulse width time value $t_{pos\_pulse}$ or the negative pulse width $t_{neg\_pulse}$. The positive pulse width $t_{pos\_pulse}$ might alternatively be called "duty cycle" and describes the proportion of the "on"-time to the regular time periods $T_{period}$. Thus, a positive duty cycle and/or the negative duty cycle could alternatively or additionally be determined as signal parameter 2a.

Another signal parameter 2a, which may be determined in a time-related signal, is the rising time $t_{rise}$ or the falling time $t_{fall}$. The rise time $t_{rise}$ is the time taken by the signal 2 to change from a specified low value to a specified high value of the signal 2. The signal 2 can also be characterized by the fall time $t_{fall}$, which is the time taken by the signal 2 to change from a specified high value to a specified low value of the signal 2. Typically, the low value is 10% and the high value is 90% of the step height. Alternative percentages for the definition of the rise time and the fall time are not excluded from the scope of the invention.

Another signal parameter 2a may be the time interval error $t_{int\_error}$, which is a signal parameter 2a that indicates the dependence of the internal processing speed of the measurement device 2 and the clock signal clk. A maximum time interval error $t_{int\_error\_max}$ is a measure of the worst case phase variation of a signal 2 with respect to the clock signal clk within a given signal duration. It is used to specify clock stability requirements in telecommunications standards. Maximum time interval error $t_{int\_error\_max}$ measurements can be used to detect clock instability that can cause data loss on a communications channel.

Another signal parameter 2a may be the cycle to cycle jitter $t_{cycle-to-cycle}$ of the signal 2. A jitter period is the interval between two times of maximum effect or minimum effect of the signal 2 that varies regularly with time. Jitter frequency, as a more commonly quoted figure, is its inverse. A jitter is the deviation from a true periodicity of a presumed periodic signal. It might be related to the clock clk. Jitter herein may be observed in the signal 2 such as the frequency of successive pulses or the phase of the signal 2 to be measured. Jitter is a significant, and usually undesired, factor in the design of almost all communications links. In clock recovery applications it is called timing jitter. Jitter can be quantified in the same terms as all time-varying signals, e.g., root mean square (RMS), or peak-to-peak displacement.

Another signal parameter 2a to be determined may be a positive switching, which is the setting time at the rising edge of the signal 2. Another signal parameter 2a to be determined may be a negative switching, which is the setting time at the falling edge of the signal 2.

Figure 3C:
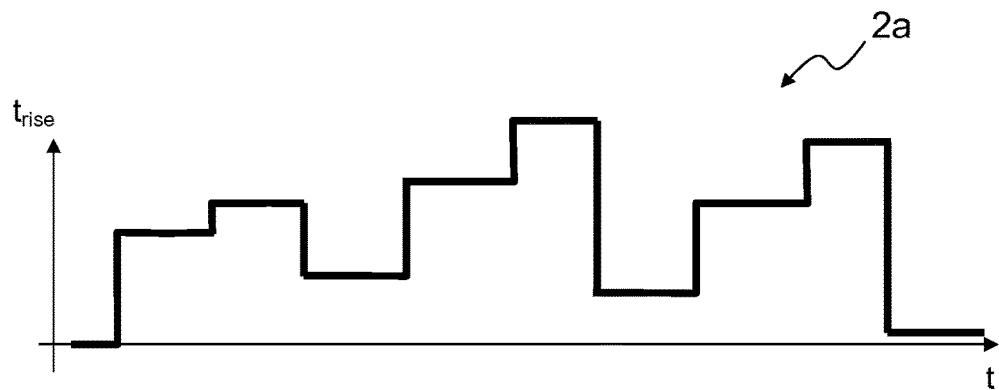
FIG. 3c shows a graphical representation of a rising time as a determined signal parameter according to example embodiments.

Typically in current measuring approaches, the signal parameter 2a is normally presented using the same time scale t but a second diagram within the display unit 5. By contrast, FIG. 3c shows a graphical representation of a rising time as a determined signal parameter according to example embodiments. The signal parameter 2a is shown in a "Measure and hold" view that represents each rising time of the signal 2 according to FIG. 3b. It might be imagined, that more than nine periods of the signal 2 are to be analyzed with the measuring device 1. Thus, it is nearly impossible to obtain any information derived from the signal parameter plot 2a according to the FIG. 3c without a zooming function, since the signal parameter 2a would be strongly compressed and no variation in the signal parameters 2a could be derived.

Further, the determination of the signal parameters 2a may be obtained by the track-function of the measurement device. The track is a waveform that shows the signal parameters 2a as determined measurement values in time-correlation to the signal 2. It is the graphical interpretation of all measurement values of a single acquisition.

Accordingly, with such example embodiments, the signal parameter 2a is advantageously presented in the same graphical representation of the signal 2.

Figure 4A:
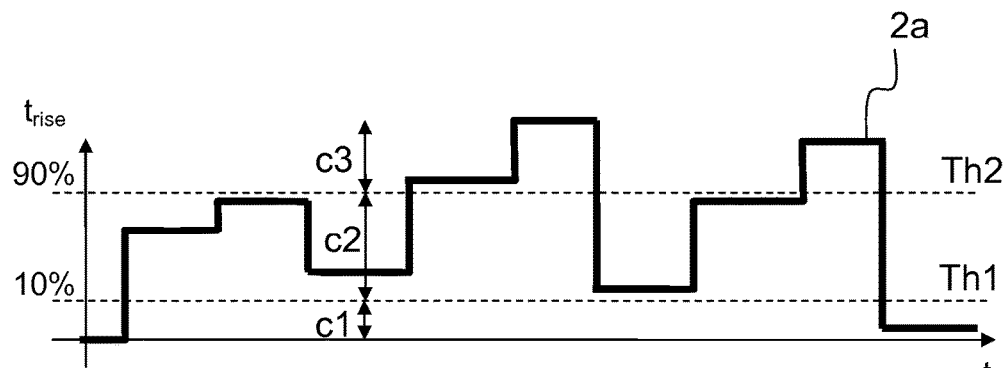
FIG. 4a shows a graphical representation of a rising time as a determined signal parameter with threshold values according to example embodiments.

FIG. 4a shows a graphical representation of a rising time trice as a determined signal parameter with threshold values Th1 and Th2 according to example. The threshold values Th1, Th2 may define borders of the signal parameter value range at which the signal parameter 2a is out of a preferred value range. Additionally or alternatively, the threshold values Th1, Th2 represent percentage values of the signal parameter value range. In FIG. 4a, the first threshold value Th1 represents a 10% value of the maximum rising time $t_{rise}$ and the second threshold value Th2 represents a 90% value of the maximum rising time $t_{rise}$. Alternatively, a logarithmic value could be chosen as the threshold values Th1, Th2.

The threshold values Th1, Th2 of FIG. 4a may thus be used to represent the signal 2 with a different appearance. As an example, the signal parameters 2a below the first threshold value Th1 are assigned to a first color c1. The signal parameters 2a between the first threshold value Th1 and the second threshold value Th2 are assigned to a second color c2. The signal parameters 2a above the second threshold value Th2 are assigned to a third color c3.

The colors c1, c2, c3 might be different color tones. A color is a visual perceptual property corresponding in humans to specific categories called red, blue, yellow, etc. Color derives from the spectrum of light—e.g., the distribution of light power versus wavelength—interacting in the eye with the spectral sensitivities of the light receptors. By defining a color space colors can be identified numerically by their coordinates.

Alternatively or additionally, different intensities of a specific color tone might be used to define the colors c1, c2, c3. The number of colors is not restricted to three. Since the display unit 5 is preferably a color display unit, it is possible to define a high number of threshold values Th and predefine the resulting signal parameter ranges with a plurality of different colors or intensities of one color tone.

The color representation of the subsequent figures is expressed by different line structures. For instance, a first color c1 is presented as a chain line. A second color c2 is presented as normal line. A third color c3 is presented as a dashed line.

Figure 4B:
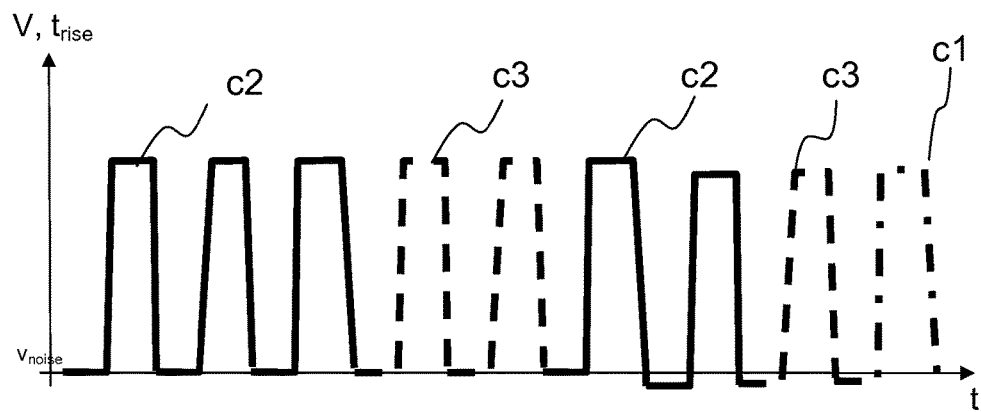
FIG. 4b shows a single graphical representation of a signal to be measured and a rising time as a determined signal parameter according to example embodiments.

FIG. 4b shows a single graphical representation of a signal to be measured and a rising time as a determined signal parameter according to example embodiments. In FIG. 4b, the rise time $t_{rise}$ is presented and classified due to the first threshold value Th1 and the second threshold value Th2 according to FIG. 4a. Each threshold value Th1, Th2 defines a border of a signal parameter range. Each signal parameter range is assigned to a specific color tone c1, c2, c3 or a specific color range or a specific intensity of a color tone. Thus, according to FIG. 4b signal parameters 2a with a value below a first threshold value Th1 are presented with a color c1. Thus, the last period of the signal 2 is presented in the first color c1. Signal parameters 2a that are above the first threshold value Th1 and below the second threshold value Th2 are presented with a second color c2. Thus, the first three periods, the sixth period and the seventh period of the signal 2 are presented in the second color c2. Signal parameters 2a with a value above the second threshold value Th2 are presented with in the third color c3.

According to FIG. 4b, a single graphical representation of the signal 2 and the signal parameter 2a is displayed on the display unit 5. The different colors c1, c2 and c3 are used to represent the signal parameter 2a in the signal itself. Thus, only one signal diagram 2 is needed to obtain a first impression on the signal parameters behavior. A user or operator of the measurement device 1 does now obtain the direct hint, at which signal region the signal parameter 2a should be evaluated in greater details. It should be noted that the signal duration is not restricted to nine periods as presented here for simplification reasons only. It should be imagined that the signal 2 comprises a huge number of periods on the diagram in the display unit 5, e.g., 100 periods or more.

Figure 4C:
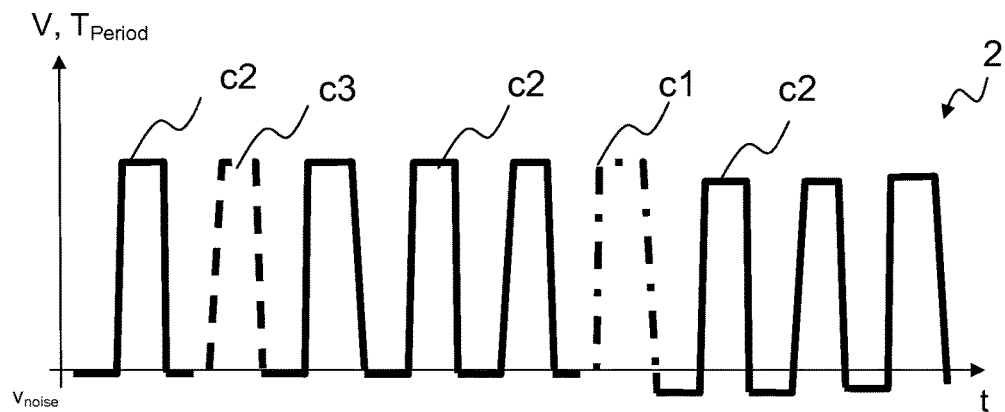
FIG. 4c shows a single graphical representation of a signal to be measured and a time period as a determined signal parameter according to example embodiments.

FIG. 4c shows a single graphical representation of a signal to be measured and a time period $T_{period}$ as a determined signal parameter according to example embodiments. Three different colors c1, c2 and c3 are used to present the signal parameter 2a in the signal 2. Here the second period and the sixth period of the signal 2 comprise values that are not between the first threshold value Th1 and the second threshold value Th2. Since the second time period $T_{period}$ value exceeds the second threshold value Th2, the second period of the signal 2 is presented in a third color c3. Since the sixth time period $T_{period}$ value is below the first threshold value Th1, the sixth period of the signal 2 is presented in a first color c1. The other periods of the signal 2 are presented in the second color c2 because the time period $T_{period}$ values are in the range between the first threshold value Th1 and the second threshold value Th2. Thus, an easy way of identifying an abnormal behavior of a signal parameter in a waveform can be applied and derived.

Figure 5A:
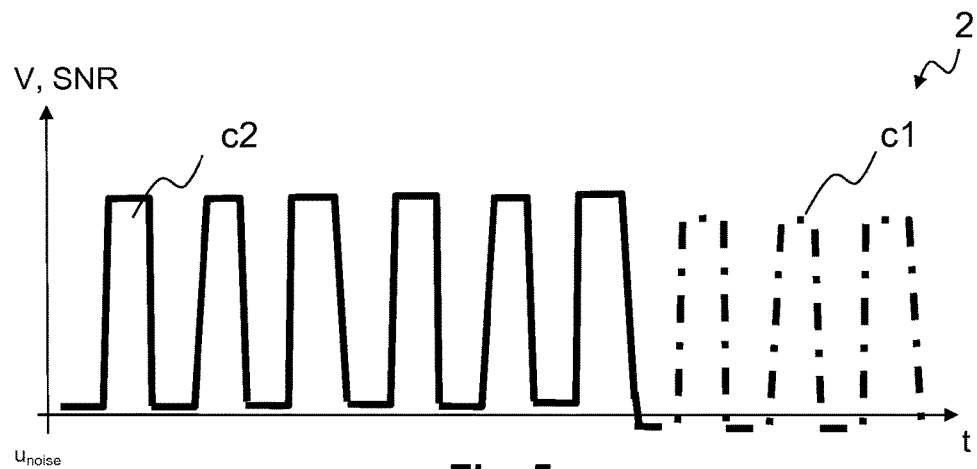
FIG. 5a shows a single graphical representation of a signal to be measured and a signal-to-noise-ratio as a determined signal parameter according to example embodiments.

FIG. 5a shows a single graphical representation of a signal to be measured and a signal-to-noise-ratio (SNR) as a determined signal parameter according to example embodiments. Since the last three periods of the signal 2 comprises a SNR below a threshold value Th, as indicated by the Noise-voltage level $v_{noise}$, the last three periods of the signal 2 are represent in a first color c1 and the remaining periods are represented in a second color c2.

Figure 5B:
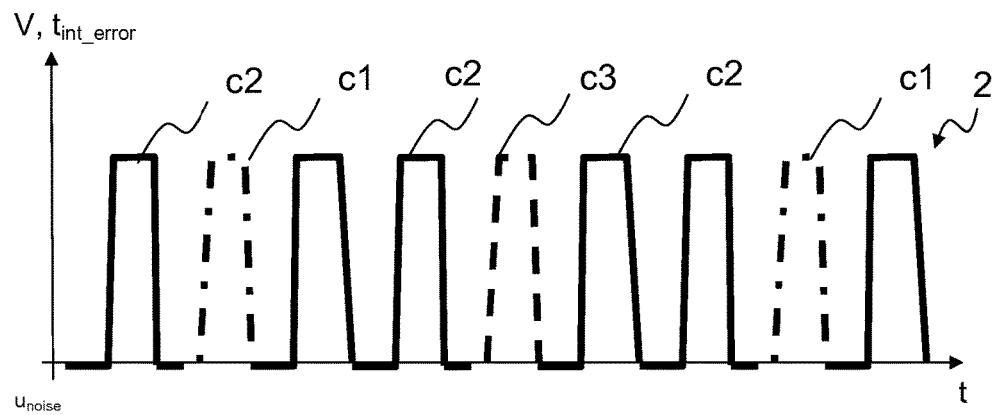
FIG. 5b shows a single graphical representation of a signal to be measured and a time interval error as a determined signal parameter according to example embodiments.

FIG. 5b shows a single graphical representation of a signal to be measured and a time interval error as a determined signal parameter according to example embodiments. Here, the second, fifth, and eighth period of the signal comprises time interval error $t_{int\_error}$ values that are not between a first threshold value Th1 and a second threshold value Th2. Since the second period and the eighth period of the signal 2 comprise time interval error $t_{int\_error}$ values that are below the first threshold value Th1, the second period of the signal 2 and the eighth period of the signal 2 are presented in a first color c1. Since the fifth period of the signal 2 comprises a time interval error $t_{int\_error}$ value that is above the second threshold value Th2, the fifth period of the signal 2 is presented in a third color c3. The other periods of the signal 2 are presented in the second color c2 because the values for the time interval error $t_{int\_error}$ are in the range between the first threshold value Th1 and the second threshold value Th2.

Figure 5C:
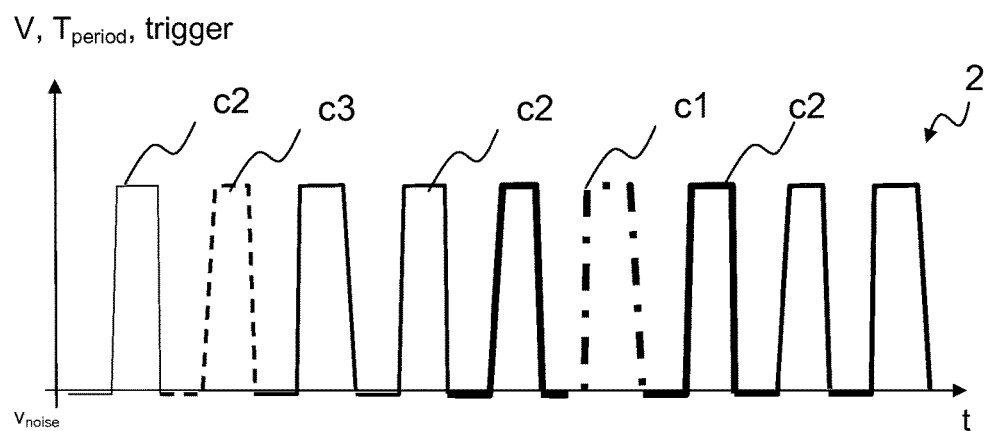
FIG. 5c shows a single graphical representation of a signal to be measured and a period as a determined signal parameter and the frequency distribution of each signal sample according to example embodiments.

FIG. 5c shows a single graphical representation of a signal to be measured and a period as a determined signal parameter and the frequency distribution of each signal sample according to example embodiments. Thus, the frequency-scale or frequency distribution of each single signal sample is combined with the signal parameter 2a and the signal 2 in a sole graphical representation of the signal 2. To avoid confusions, the signal parameter 2a in FIG. 5c is the time period value as presented in FIG. 4c. The frequency in which a signal parameter occurs is displayed in different contrast values. For simplicity reasons, different contrast values in FIG. 5c are represented as different line widths.

As can be derived from the FIG. 5c, the first period and the second period of the signal 2 are displayed in a smaller line width compared to the third, fourth, eighth and ninth period of the signal 2. This is because the first and second period has not been triggered that often and is thus represented with lower contrast values. Additionally, the fifth to seventh periods of the signal 2 are displayed in a thick line width compared to the third, fourth, eighth and ninth period of the signal 2. This is because the fifth to seventh period have been triggered more often and are thus represented with higher contrast values. Thus, the color represents the variation of the signal parameter 2a and the contrast value represents the frequency-scale information. Thus, a combination of frequency-scale information, signal parameter 2a information and signal information are presented in one graphical representation.

Figure 6A:
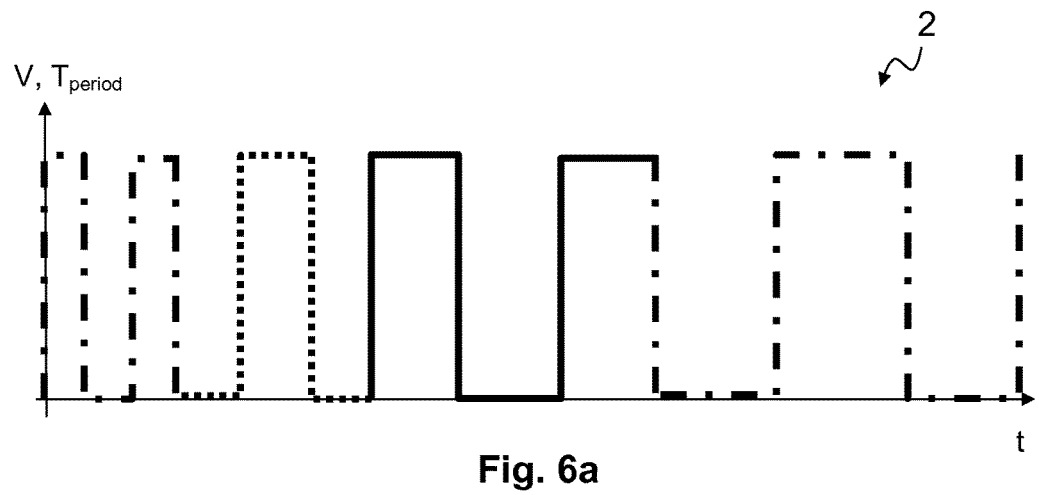
FIG. 6a shows the dependency of a period value of a time-related signal over the time and the color value according to example embodiments.

FIG. 6a shows the dependency of a period value of a time-related signal over the time and the color value according to example embodiments. The color difference is presented with different line types. As an example only, four different colors are used for four different time period values. Alternatively, the intensity of a single color tone might be dependent on the time period $T_{period}$. As longer as the time periods $T_{period}$ are, as darker the color tone becomes, or vice versa.

Figure 6B:
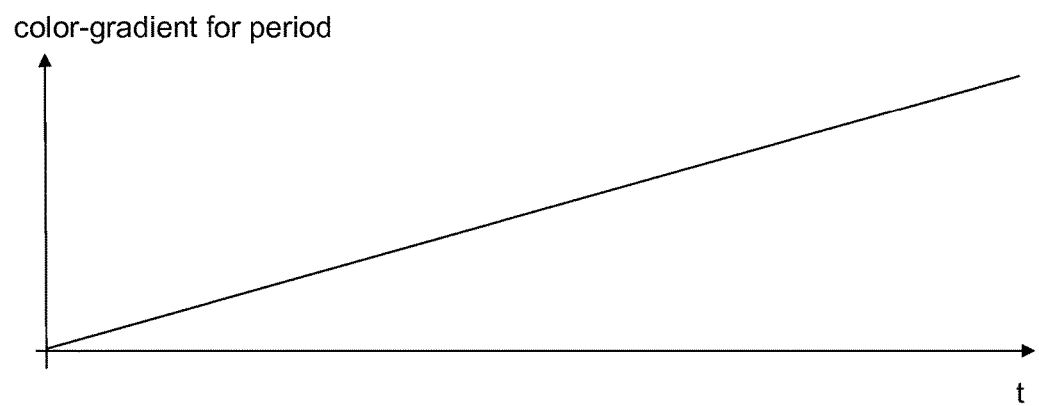
FIG. 6b shows the dependency of the color gradient for the period value in view of the time-scale according to example embodiments.

FIG. 6b shows the dependency of the color gradient for the period value $T_{period}$ in view of the time-scale according to example embodiments. Here it is shown that the color differs linearly based of the time value. Thus, no discrete threshold values Th1, Th2 are defined and the number of different colors is much higher.

Figure 7:
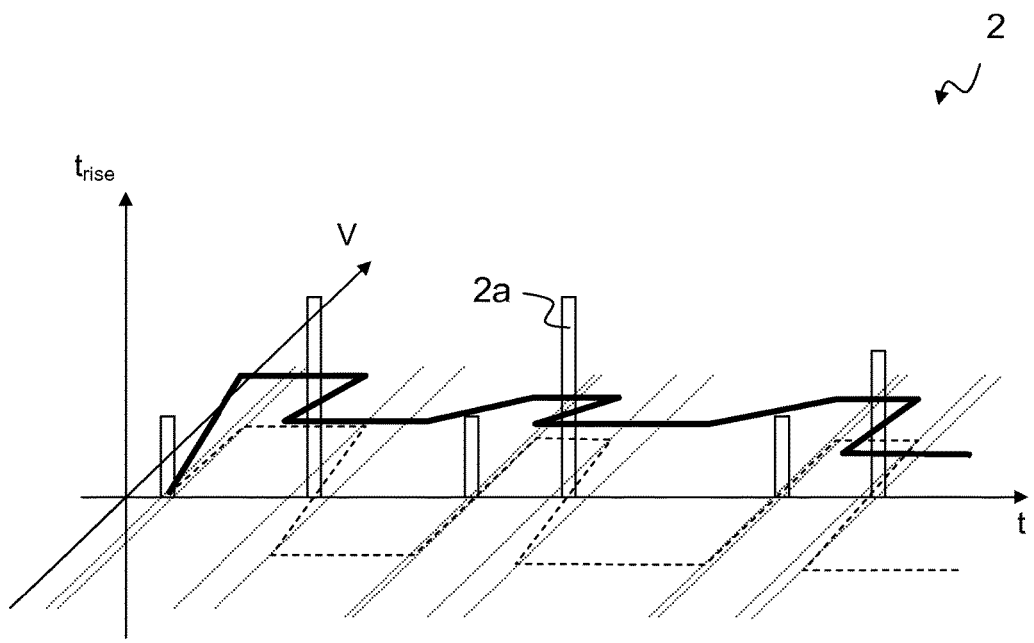
FIG. 7 shows a 3D graphical representation of the signal to be measured and the determined signal parameter according to example embodiments.

FIG. 7 shows a 3D graphical representation of the signal to be measured and the determined signal parameter according to example embodiments. Thus, a third dimension in a 3D plot is used to display the signal parameter 2a. The signal 2 is displayed in a dashed line in a 2D representation. The dotted lines present the rise time $t_{rise}$ and the falling time $t_{fall}$ of the signal 2 for improved orientation and might not be included in the diagram of the display unit 5. The dependence between the signal parameters 2a and the signal 2 is provided in the z-coordinate. Here, the rising time $t_{rise}$ is used as a signal parameter 2a. The 3D plot is drawn in simplified manner and should only indicate the characteristics of the graphical representation.

Figure 8:
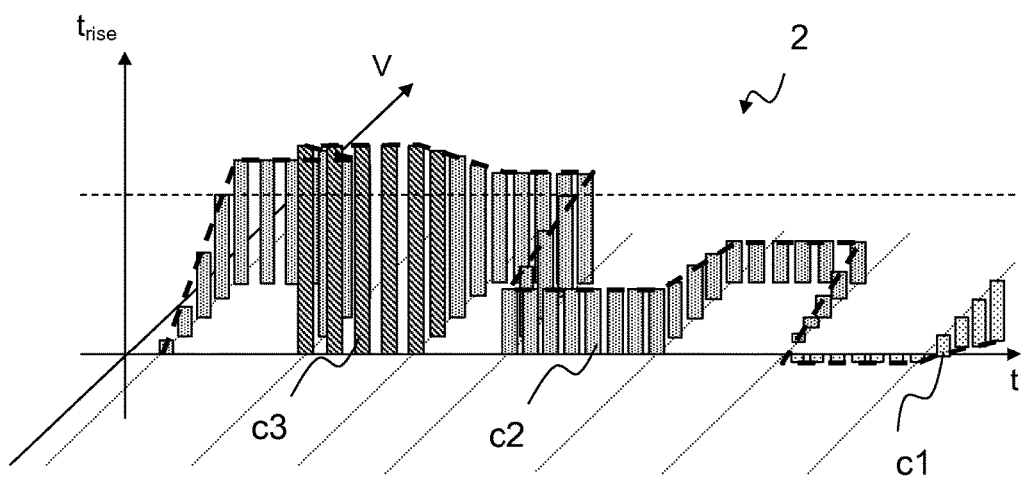
FIG. 8 shows a further 3D graphical representation of the signal to be measured and the determined signal parameter according to example embodiments.

FIG. 8 shows a further 3D graphical representation of the signal to be measured and the determined signal parameter according to example embodiments. In difference to FIG. 7, the graphical representation of the signal 2 is shown as a plurality of bars. Additionally, the second period of the signal 2 is presented in a third color c3, since a threshold value Th2 of the signal parameter 2a has been exceeded. Additionally, the last period of the signal 2 is presented in a first color c1, since a threshold value Th1 of the signal parameter 2a has been undercut. The remaining periods of the signal 2 are presented in a second color c2, since the value of the signal parameter 2a is in between a first threshold value Th1 and a second threshold value Th2 of the signal parameter 2a.

The shown graphical representations provide simplified example embodiments of the invention.

A threshold value Th1, Th2 might be defined automatically due to a predefined percentage or logarithmic presetting or might be adjusted manually by the user or operator of the measurement device.

An assignment of a specific color to a predefined signal parameter range might be defined automatically due to a presetting in the measurement device 1 or might be adjusted manually by the user or operator of the measurement device.

An assignment of a specific color range to a predefined signal parameter range might be defined automatically due to a presetting in the measurement device 1 or might be adjusted manually by the user or operator of the measurement device.

Different signal parameters might be assigned to different specific colors or color ranges in an automatic manner due to a presetting in the measurement device 1 or might be adjusted manually by the user or operator of the measurement device. Thus, a first signal parameter might be assigned to a first color tone and the variation of the first signal parameter is expressed by the intensity of the first color tone. Thus, a second signal parameter might be assigned to a second color tone and the variation of the second signal parameter is expressed by the intensity of the second color tone.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method for visually presenting a signal parameter in a displayed signal comprising:
   receiving, by a measuring device, a signal to be measured;
   measuring the signal to be measured;
   buffering the measured signal in a buffer;
   displaying the buffered signal on a display;
   determining, via a track-function of the measuring device, at least one signal parameter of the buffered signal in at least two separate corresponding signal regions of the buffered signal, wherein the at least one signal parameter comprises one or more of a rise time, a fall time, a positive pulse width, a negative pulse width, a positive duty cycle, a negative duty cycle, a positive switching as a setting time at rising edges, a negative switching as a settling time at falling edges, jitter, cycle-to-cycle jitter, a time interval error, and a sweep rate, and wherein the signal parameter(s) are determined based only on the buffered measured signal;
   displaying the determined signal parameter(s) in the displayed signal at the corresponding signal regions, wherein the signal parameter(s) are displayed in miscolors that differ linearly based on the parameter values; and
   identifying an abnormal behavior in the determined signal parameter(s) of the buffered signal.

2. The method according to claim 1, wherein a color is pre-defined for a specific signal parameter range.

3. The method according to claim 1, wherein a respective color is pre-defined based on one or more threshold values of at least one of the signal parameter(s).

4. The method according to claim 3, wherein the threshold values are configurable.

5. The method according to claim 1, wherein at least two signal parameters are directly displayed in the displayed signal.

6. The method according to claim 1, wherein the determined signal parameter(s) and the displayed signal are displayed in three-dimensions.

7. The method according to claim 1, wherein the displayed signal parameter(s) are displayed based on respective contrast-values dependent on a frequency-distribution.

8. The method according to claim 1, wherein the signal is displayed in a time-domain and wherein at least one of the signal parameter(s) is a time-related signal parameter.

9. The method according to claim 1, wherein the signal is displayed in a frequency-domain and wherein at least one of the signal parameter(s) is a frequency-related signal parameter.

10. The method according to claim 1, wherein the determined signal parameter(s) are displayed in the displayed signal in a first diagram on the display, and the determined signal parameter(s) are displayed in a second diagram on the display.

11. The method according to claim 1, wherein at least one of the signal parameter(s) is displayed as a specific color that varies its color tone based on respective values of the signal parameter.

12. A measuring apparatus for visually presenting a signal parameter in a displayed signal comprising:
   an input terminal configured to receive an applied signal;
   a measurement device configured to measure the applied signal;
   a buffer configured to buffer the measured signal;
   a display configured to display the buffered signal; and
   a processor configured to determine, via a track-function, at least one signal parameter from the buffered signal, wherein the at least one signal parameter comprises one or more of a rise time, a fall time, a positive pulse width, a negative pulse width, a positive duty cycle, a negative duty cycle, a positive switching as a setting time at rising edges, a negative switching as a settling time at falling edges, jitter, cycle-to-cycle jitter, a time interval error, and a sweep rate, and wherein the signal parameter(s) are determined based only on the buffered measured signal; and
   wherein the signal parameter(s) of the buffered signal are determined in at least two separate signal regions; and
   wherein each of the determined signal parameter(s) are displayed on the display within the display of the buffered signal at the corresponding signal region, wherein the signal parameter(s) are displayed in miscolors that differ linearly based on the parameter values; and
   wherein an abnormal behavior is identified in the determined signal parameter(s) of the buffered signal.

13. The measuring apparatus according to claim 12, wherein the measurement device comprises an analog-to-digital converter configured to oversample the applied signal.

14. The measuring apparatus according to claim 12, wherein the display is configured to display the signal parameter(s) within the display of the buffered signal in a first diagram and to display the signal parameter(s) in a second diagram.

* * * * *